Jan. 2, 1940.    A. E. ANDERSON    2,185,825
CIRCUIT BREAKER CONTROL SYSTEM
Filed Oct. 26, 1937
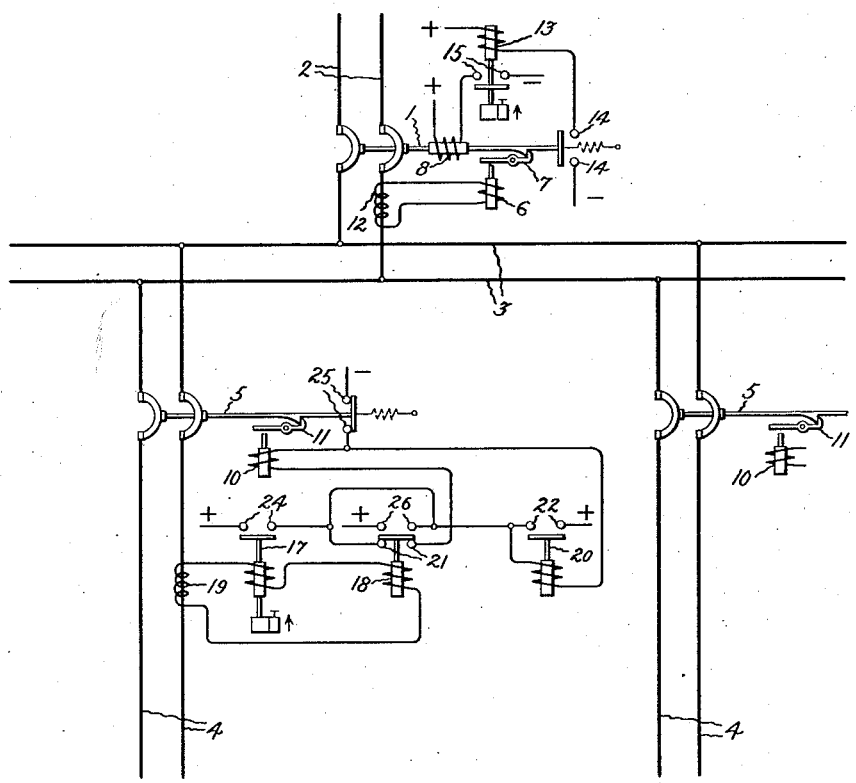
Inventor:
Arvid E. Anderson,
by Harry E. Dunham
His Attorney.

Patented Jan. 2, 1940

2,185,825

UNITED STATES PATENT OFFICE 2,185,825

CIRCUIT BREAKER CONTROL SYSTEM

Arvid E. Anderson, Drexel Hill, Pa., assignor to General Electric Company, a corporation of New York Application October 26, 1937, Serial No. 171,060

9 Claims. (Cl. 175—294)

My invention relates to circuit breaker control systems and particularly to a system for controlling two circuit breakers, which are connected in series in an electric circuit, so that a fault of a predetermined character causes one of the circuit breakers to be automatically opened and reclosed and the other circuit breaker to be opened during the interval that the first circuit breaker is open, and one object of my invention is to provide such an arrangement which requires no control circuits between the two circuit breakers which may be located at different points.

Another object of my invention is to provide an improved circuit breaker control system whereby a circuit breaker is opened in response to certain current conditions in the circuit when the fault is of one character and in response to other current conditions when the fault is of a different character.

Although my invention is adapted for use in many different types of electric distribution systems, it is especially adapted for use in a system in which each of a plurality of feeder circuits is connected to a common load bus by an individual circuit breaker, and the common load bus in turn is connected to a supply circuit by a single group breaker of relatively large interrupting capacity. In such a system it is customary to provide a control system for the various circuit breakers so that a fault current in excess of a predetermined value on any feeder circuit effects first the opening of the group breaker, then the opening of the breaker in the faulty feeder, and then the reclosure of the group breaker. Heretofore all such systems have required the use of control circuits between the group circuit breaker and the feeder breakers so as to insure the proper sequence of operation of the circuit breakers. In accordance with my invention, I provide an improved control arrangement which effects the desired sequential operation of the circuit breakers without any control circuits between the group breaker and the feeder breakers.

My invention will be better understood from the following description when taken in connection with the accompanying drawing which diagrammatically illustrates a circuit breaker control system embodying my invention, and its scope will be pointed out in the appended claims.

Referring to the accompanying drawing, 1 represents a circuit breaker which is arranged to connect a supply circuit 2 to a load bus 3.

A plurality of load circuits 4 are respectively arranged to be connected to the load bus 3 by circuit breakers 5. The circuit breakers 1 and 5 may be of any suitable type, examples of which are well known in the art. In order to simplify the drawing, I have shown the circuit breaker 1 as a latched-in circuit breaker having a trip coil 6 which, when sufficiently energized, releases a latch 7 that holds the circuit breaker in its closed position and a closing coil 8 which when energized, closes the circuit breaker. The circuit breakers 5 are also shown as latched-in circuit breakers and are provided with trip coils 10 which, when sufficiently energized, release the latches 11 that hold the circuit breakers in their closed position. In the particular embodiment of my invention, shown in the drawing, it is assumed that the circuit breakers 5 are manually closed, but it will be obvious that any other suitable closing means either manually or automatically controlled, examples of which are well known in the art, may be provided for closing the circuit breakers 5. Also, in order to simplify the disclosure, only the control apparatus for automatically effecting the opening of one of the circuit breakers 5 is shown in detail since the control apparatus for all of the circuit breakers 5 may be the same.

In order to effect the opening of the group breaker 1 in response to a predetermined abnormal condition, such as a fault of a predetermined character on any one of the load circuits 4, the trip coil 6 of the circuit breaker 1 is connected by means of a current transformer 12 to the supply circuit 2 so that the trip coil 6 is energized in accordance with the magnitude of the current flowing between the supply circuit 2 and the load bus 3. When a current of a predetermined value flows through the supply circuit 2 to the load bus 3, sufficient current flows through the trip coil 6 to release the latch 7 and allow the circuit breaker 1 to open.

Since it is desirable to have service restored to the load bus 3 as soon as possible after the group breaker 1 opens, this circuit breaker has associated therewith suitable means, examples of which are well known in the art, for effecting the reclosure thereof a predetermined definite time after it is opened. As shown in the drawing, this automatic reclosing means consists of an auxiliary relay 13, the circuit of which is arranged to be completed by the auxilary contacts 14 on the circuit breaker 1 when it is in its open position. The relay 13, when energized, completes at its contacts 15 an energizing circuit for the closing coil 8 of the circuit breaker 1.

Each load circuit 4 has associated therewith suitable means for effecting the disconnection thereof from the bus 3 in response to predetermined abnormal conditions on the respective load circuit. As shown, each circuit breaker 5 has associated therewith two overcurrent relays 17 and 18, the operating coils of which are connected in any suitable manner to the associated load circuit 4 so that they are energized in accordance with the current flowing through the load circuit. As shown, the operating coils of the relays 17 and 18 are connected to the associated load circuit 4 by a current transformer 19. Each overcurrent relay 17 has a lower current and a longer time setting than the associated overcurrent relay 18 so that when the current in the associated feeder circuit 4 exceeds one predetermined value but is less than another higher value, the associated overcurrent relay 17 operates, after a predetermined time, to effect the opening of the associated circuit breaker 5. When, however, the overcurrent is severe enough to effect the operation of the relay 18, the opening of the contacts 21 of this relay interrupts the energizing circuit of the trip coil 10 which is completed by the overcurrent relay 17. The overcurrent relay 18, when in its energized position, completes a circuit for an associated controlling relay 20 which, when energized, completes a locking circuit for itself and closes contacts 22 in an energizing circuit for the trip coil 10 which is completed by the contacts 21 of the overcurrent relay 18 when it returns to its normal position.

The relative operating times of the relays 17, 18 and 20 and the opening times of the circuit breakers 1 and 5 are designed so that when a fault occurs on any one of the feeder circuits which is severe enough to effect the opening of the group breaker 1, the group breaker 1 opens before the feeder circuit breaker 5 in the faulty circuit but not until after the circuit of the relay 20 has been completed. Also, the time relay 13 is set so that it does not operate to effect the reclosing of the circuit breaker 1 until a sufficient time interval has elapsed after the circuit breaker 1 opens to allow the circuit breaker 5 in the faulty feeder to open.

The operation of the control system shown in the drawing is as follows: When a fault occurs on any feeder circuit 4 which causes sufficient current to flow to effect only the operation of the overcurrent relay 17 in the faulty feeder, this overcurrent relay, after a time interval, closes its contacts 24 and completes an energizing circuit for the trip coil 10 of the breaker 5 in the faulty feeder to effect the disconnection thereof from the load bus 3. This energizing circuit also includes the contacts 21 of the associated overcurrent relay 18 and the auxiliary contacts 25 on the circuit breaker 5 in the faulty feeder. When, however, the fault is severe enough to cause sufficient current to flow through the supply circuit 2 to energize the trip coil 6 so as to effect the opening of the group breaker 1, sufficient current is also supplied to the overcurrent relay 18 in the faulty feeder 4 so that it opens its contacts 21 and closes its contacts 26 before the associated overcurrent relay 17 can close its contacts 24. The closing of contacts 26 of the overcurrent relay 18 completes through contacts 25 on the associated circuit breaker 5 an energizing circuit for the associated control relay 20. By closing its contacts 22, relay 20 completes a shunt circuit around the contacts 26 of the associated overcurrent relay 18 so that the relay 20 remains energized when the relay 18 subsequently opens its contacts 26 in response to the current in the feeder current 4 decreasing below a predetermined value. The time settings of the relays 18 and 20 are such that the relay 20 closes its contacts 22 before the group breaker 1 opens and before the associated overcurrent relay 17 closes its contacts 24. When the current in the faulty feeder 4 decreases below a predetermined value after the group breaker 1 opens to disconnect the supply circuit 2 from the faulty feeder 4, the overcurrent relays 17 and 18 are restored to their normal positions and a circuit is completed for the trip coil 10 of the circuit breaker 5 in the faulty feeder to effect the opening thereof. This trip coil circuit includes the contacts 25 of the circuit breaker 5, the contacts 21 of the relay 18, and the contacts 22 of the relay 20. Therefore, it will be seen that the opening of each feeder breaker 5 depends solely upon the current flow in its respective feeder.

The group breaker 1, by closing its auxiliary contacts 14, when it is in its open position, completes an energizing circuit for the definite time relay 13 which, after being energized for a predetermined definite time, closes its contacts 15 to complete an energizing circuit for the closing coil 8 of the breaker 1. The time setting of the relay 13 is such that sufficient time elapses after the opening of the circuit breaker 1 to allow the circuit breaker 5 in the faulty feeder 4 to open before the group breaker 1 is reclosed.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a supply circuit, an electric circuit, a circuit breaker connecting said supply circuit to said electric circuit, a second electric circuit, a second circuit breaker connecting said electric circuits, means responsive to a predetermined abnormal current flow through said first mentioned circuit breaker for opening said first mentioned circuit breaker, means independent of the conditions of said second electric circuit and said second circuit breaker for reclosing said first mentioned circuit breaker a predetermined time interval after the opening thereof, and means controlled by the current changes in said second electric circuit due to an abnormal circuit condition occurring therein and to the subsequent opening of said first mentioned circuit breaker resulting from said abnormal current condition for effecting the opening of said second circuit breaker during the time interval said first mentioned circuit breaker is open.

2. In combination, a supply circuit, an electric circuit, a circuit breaker connecting said supply circuit to said electric circuit, a second electric circuit, a second circuit breaker connecting said electric circuits, means responsive to a predetermined abnormal current flow through said circuit breaker for effecting the opening of said first mentioned circuit breaker, means independent of the conditions of said second electric circuit and said second circuit breaker for reclosing said first mentioned circuit breaker a predetermined time interval after the opening thereof, and means responsive to the current in said second electric circuit increasing above a predetermined value and subsequently decreasing below a predetermined value for effecting the opening of said second circuit breaker during the time interval said first mentioned circuit breaker is open when an abnormal circuit condition occurs in said second electric circuit which effects the operation of said first mentioned means.

3. In combination, a supply circuit, an electric circuit, a circuit breaker connecting said supply circuit to said electric circuit, means responsive to a predetermined abnormal current flow through said circuit breaker for effecting the opening of said circuit breaker a predetermined time interval after said abnormal current flow occurs and the reclosing of said circuit breaker a predetermined definite time interval after it opens, a second electric circuit, a second circuit breaker connecting said electric circuits, and means for opening said second circuit breaker while said first-mentioned circuit breaker is open due to a fault on said second circuit including two sets of contacts, means responsive to the current flowing in said second circuit for effecting the closing of one of said sets of contacts when the current flowing in said second circuit increases above a predetermined value and the closing of the other set of contacts when the current flowing in said second circuit is below a predetermined value, means for maintaining said one set of contacts closed independently of the current flowing in said second circuit, and means responsive to the simultaneous closure of said sets of contacts for effecting the opening of said second circuit breaker.

4. In combination, a supply circuit, an electric circuit, a circuit breaker connecting said supply circuit to said electric circuit, means responsive to a predetermined abnormal current flow through said circuit breaker for effecting the opening of said circuit breaker a predetermined time interval after said abnormal current flow occurs and the reclosing of said circuit breaker a predetermined definite time interval after it opens, a second electric circuit, a second circuit breaker connecting said electric circuits, and means for opening said second circuit breaker while said first-mentioned circuit breaker is open due to a fault on said second circuit including two sets of contacts, means responsive to the current flowing in said second circuit for effecting the closing of one of said sets of contacts when the current flowing in said second circuit increases above a predetermined value and the closing of the other set of contacts when the current flowing in said second circuit is below a predetermined value, means for maintaining said one set of contacts closed independently of the current flowing in said second circuit until said second circuit breaker is open, and means responsive to the simultaneous closure of said sets of contacts for effecting the opening of said second circuit breaker.

5. In combination, a supply circuit, an electric circuit, a circuit breaker connecting said supply circuit to said electric circuit, means responsive to a predetermined abnormal current flow through said circuit breaker for effecting the opening of said circuit breaker a predetermined time interval after said abnormal current flow occurs and the reclosing of said circuit breaker a predetermined definite time interval after it opens, a relay responsive to the current flow to said second circuit and having contacts which are closed when said current flow is above a predetermined value and other contacts which are closed when said current flow is below said predetermined value, a second relay, means dependent upon the closing of said first-mentioned contacts for completing an energizing circuit for said second relay, means responsive to the energization of said second relay for completing a holding circuit therefor, and means responsive to the closing of said other contacts while said second relay is energized for effecting the opening of said second circuit breaker, said relays having operating times of such duration that when an abnormal circuit condition occurs in said second circuit which effects the operation of said first-mentioned means said holding circuit is completed before said first-mentioned circuit breaker opens and said second circuit breaker is opened during said predetermined different time interval that said first-mentioned circuit breaker is open.

6. In combination, an electric circuit, a circuit breaker in said circuit, means responsive to a predetermined abnormal current flow through said circuit breaker which is less than a predetermined value for effecting the opening of said circuit breaker, and means responsive to a predetermined abnormal current flow through said circuit breaker which is greater than said predetermined value for effecting the opening of said circuit breaker only after the current in said circuit has subsequently decreased below a predetermined value.

7. In combination, an electric circuit, a circuit breaker in said circuit, means responsive to an overcurrent in said circuit above one predetermined value and less than another higher predetermined value for effecting after a time delay the opening of said circuit breaker, other means responsive to an overcurrent in said circuit above said higher predetermined value for rendering said first-mentioned overcurrent responsive means inoperative to effect the opening of said circuit breaker, and means controlled by said other means for effecting the opening of said circuit breaker when the current in said circuit decreases below a predetermined value after having first exceeded said higher predetermined value.

8. In combination, an electric circuit, a circuit breaker in said circuit, two overcurrent relays connected to said circuit, one of said relays having a lower current setting and a longer operating time than the other, a trip coil for said circuit breaker, means controlled by said overcurrent relays for effecting the energization of said trip coil when said one of said overcurrent relays is operated by an overcurrent and the other of said overcurrent relays is in its normal position, a control relay, means controlled by said other of said overcurrent relays for effecting the operation of said control relay, and means controlled by said control relay and said other overcurrent relay for completing an energizing circuit for said trip coil when said control relay is in its operated position and said other overcurrent relay is in its normal position.

9. In combination, an electric circuit, a circuit breaker in said circuit, two overcurrent relays connected to said circuit, one of said relays having a lower current setting and a longer operating time than the other, a trip coil for said circuit breaker, an energizing circuit for said trip coil including in series normally open contacts of said one of said relays and normally closed contacts of the other of said relays, a control relay, means controlled by said other of said overcurrent relays for effecting the operation of said control relay when an overcurrent in said circuit effects the operation of said other current relay, and means controlled by said control relay and said other overcurrent relay for completing an energizing circuit for said trip coil when said control relay is in its operated position and said other overcurrent relay is in its normal position.

ARVID E. ANDERSON.